(12) United States Patent
Brady

(10) Patent No.: US 6,340,191 B1
(45) Date of Patent: Jan. 22, 2002

(54) TRUCK STORAGE BOX

(75) Inventor: Joseph Brady, Otis Orchards, WA (US)

(73) Assignee: Merritt Equipment Company, Henderson, CO (US)

(*) Notice: Subject to any disclaimer, the term of this patent is extended or adjusted under 35 U.S.C. 154(b) by 0 days.

(21) Appl. No.: 09/480,080

(22) Filed: Jan. 10, 2000

Related U.S. Application Data

(60) Provisional application No. 60/118,950, filed on Feb. 5, 1999.

(51) Int. Cl.$^7$ .............................................. B60R 3/00
(52) U.S. Cl. ................. 296/37.6; 296/180.2; 280/164.1
(58) Field of Search .......................... 296/180.1, 180.2, 296/37.6; 280/163, 164.1

(56) References Cited

U.S. PATENT DOCUMENTS

| | | | |
|---|---|---|---|
| 1,453,362 A | | 5/1923 | Loveland |
| 1,532,756 A | | 4/1925 | Kaufman |
| 2,572,774 A | * | 10/1951 | Smith et al. ................ 296/37.6 |
| 3,240,408 A | * | 3/1966 | Lapansie .................... 224/401 |
| 3,667,563 A | * | 6/1972 | Korb et al. ................. 180/68.5 |
| 3,930,552 A | * | 1/1976 | Kunkle et al. ............. 180/68.5 |
| 4,013,300 A | * | 3/1977 | Berger ....................... 180/68.5 |
| 4,074,786 A | | 2/1978 | Joubert ...................... 180/68.5 |
| 4,126,349 A | * | 11/1978 | Nelson et al. ............. 296/24.1 |
| 4,135,761 A | * | 1/1979 | Ward .......................... 296/37.6 |
| 4,518,188 A | * | 5/1985 | Witten ......................... 296/91 |
| 4,696,507 A | | 9/1987 | Alldredge .................. 296/37.6 |
| 4,836,568 A | | 6/1989 | Preslik et al. ............. 280/164.1 |
| 4,948,169 A | * | 8/1990 | Amundson ............... 296/37.14 |
| 4,991,906 A | | 2/1991 | Fingerle .................... 296/180.2 |
| 5,033,567 A | * | 7/1991 | Washburn et al. .......... 296/183 |
| 5,083,829 A | * | 1/1992 | Fonseca ..................... 296/37.6 |
| 5,232,259 A | * | 8/1993 | Booker ...................... 296/37.6 |
| 5,251,947 A | * | 10/1993 | Kirila, II et al. ........... 296/37.6 |
| 5,316,358 A | * | 5/1994 | Payne et al. ................ 296/37.6 |
| 5,458,353 A | | 10/1995 | Hanemaayer ............ 280/164.1 |
| 5,498,049 A | * | 3/1996 | Schlachter ................. 296/37.6 |
| 5,538,315 A | * | 7/1996 | Dixon ...................... 296/180.1 |
| 5,593,167 A | | 1/1997 | Barnhardt et al. ....... 280/164.1 |
| 5,695,207 A | * | 12/1997 | Mounterde et al. ......... 280/163 |
| 5,788,321 A | * | 8/1998 | McHorse et al. ........ 296/180.1 |
| 5,823,598 A | * | 10/1998 | Clare et al. ................ 296/37.6 |
| 6,030,018 A | * | 2/2000 | Clare et al. ................ 296/37.6 |

* cited by examiner

Primary Examiner—Stephen T. Gordon
Assistant Examiner—Hilary "LBC" Gutman
(74) Attorney, Agent, or Firm—Reidlaw, L.L.C.; John S. Reid

(57) ABSTRACT

A truck storage box having an access door, wherein the access door has, mounted thereon, an aerodynamic body panel of the kind used on commercial trucks and the like. The access door is hinged along a vertical hinge to open in a traditional door-like manner. The storage box can be affixed to the truck chassis between the front and rear axles of the truck. The aerodynamic body panel on the storage box can be overlapped on one end by an adjacent body panel such that access door of the storage box can be opened without interference between the two body panels. The access door can further include a step or steps which can be used by a driver for ingress and egress from the truck cab. The storage box further includes a latch and a locking mechanism to secure the access door in a closed position. A method of retrofitting a commercial truck having aerodynamic body panels with a storage box is also disclosed. A first body panel located between the front and rear axles of the truck below the cab of the truck is removed from the truck to provide a space for the storage box. The storage box is secured to the chassis frame rail of the truck. The first body panel is then secured to a front access door of the storage box. The storage box is dimensioned such that when the first body panel is attached to the access door, the body panel is located in the same position as it originally was on the truck prior to being removed.

3 Claims, 10 Drawing Sheets

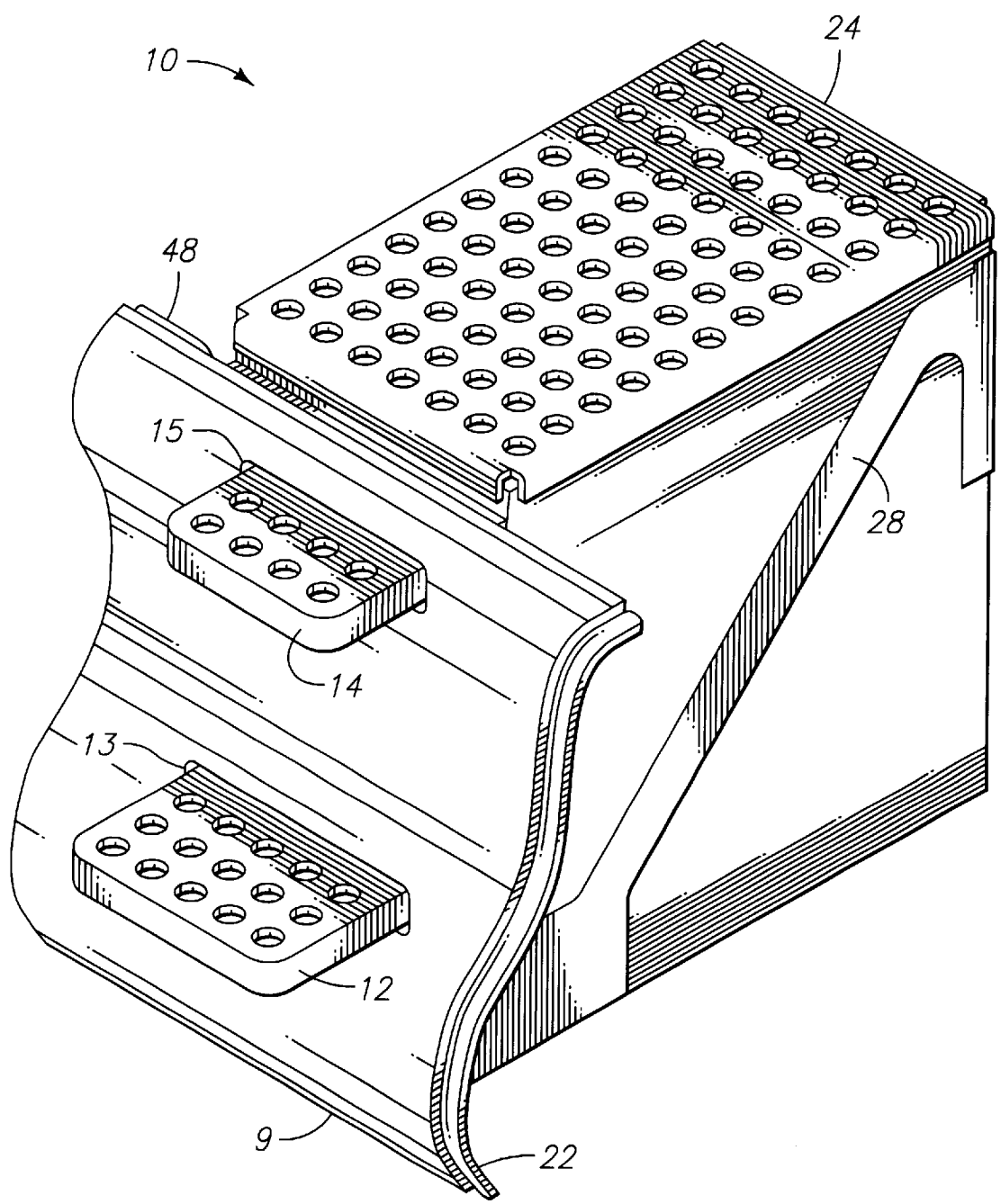

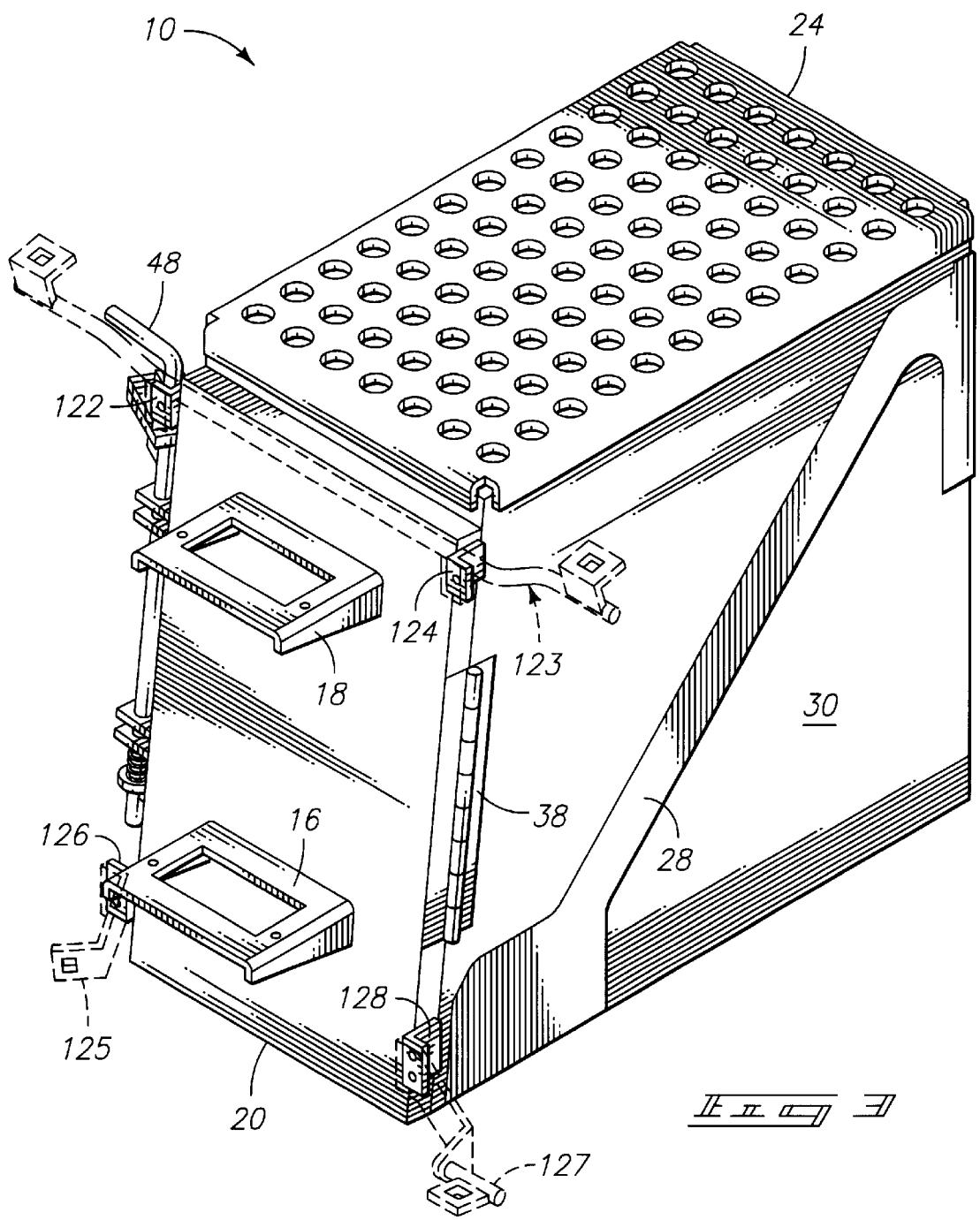

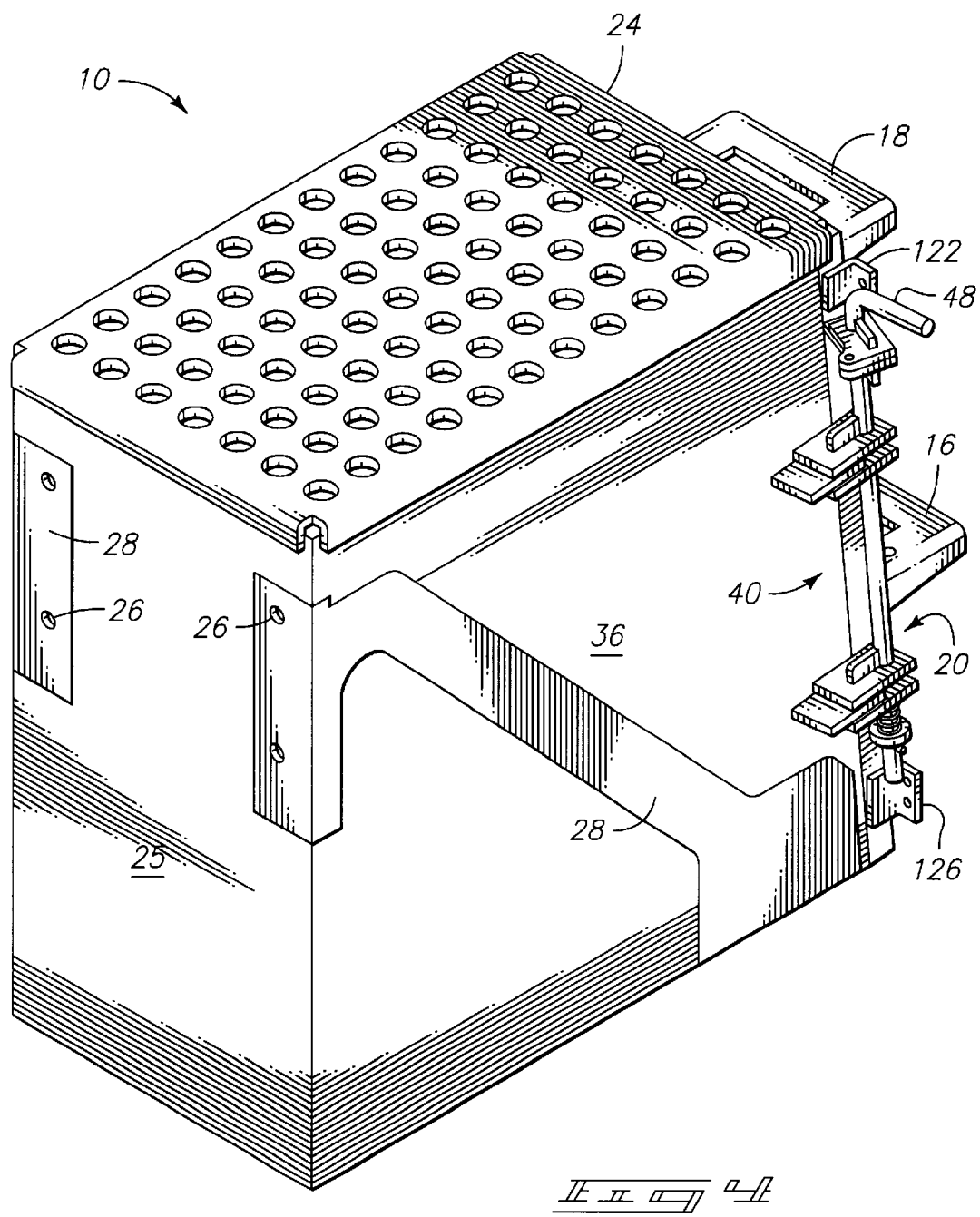

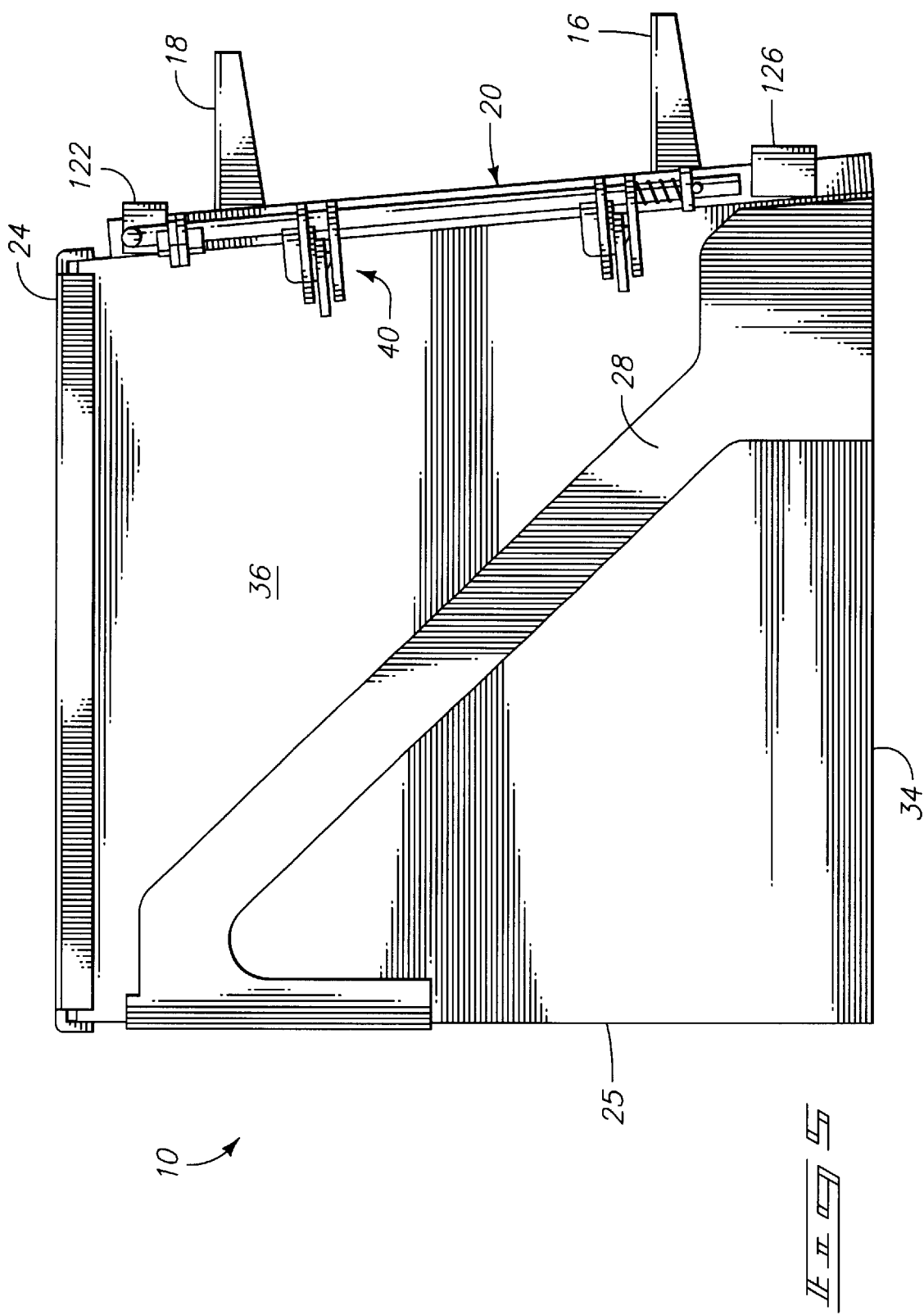

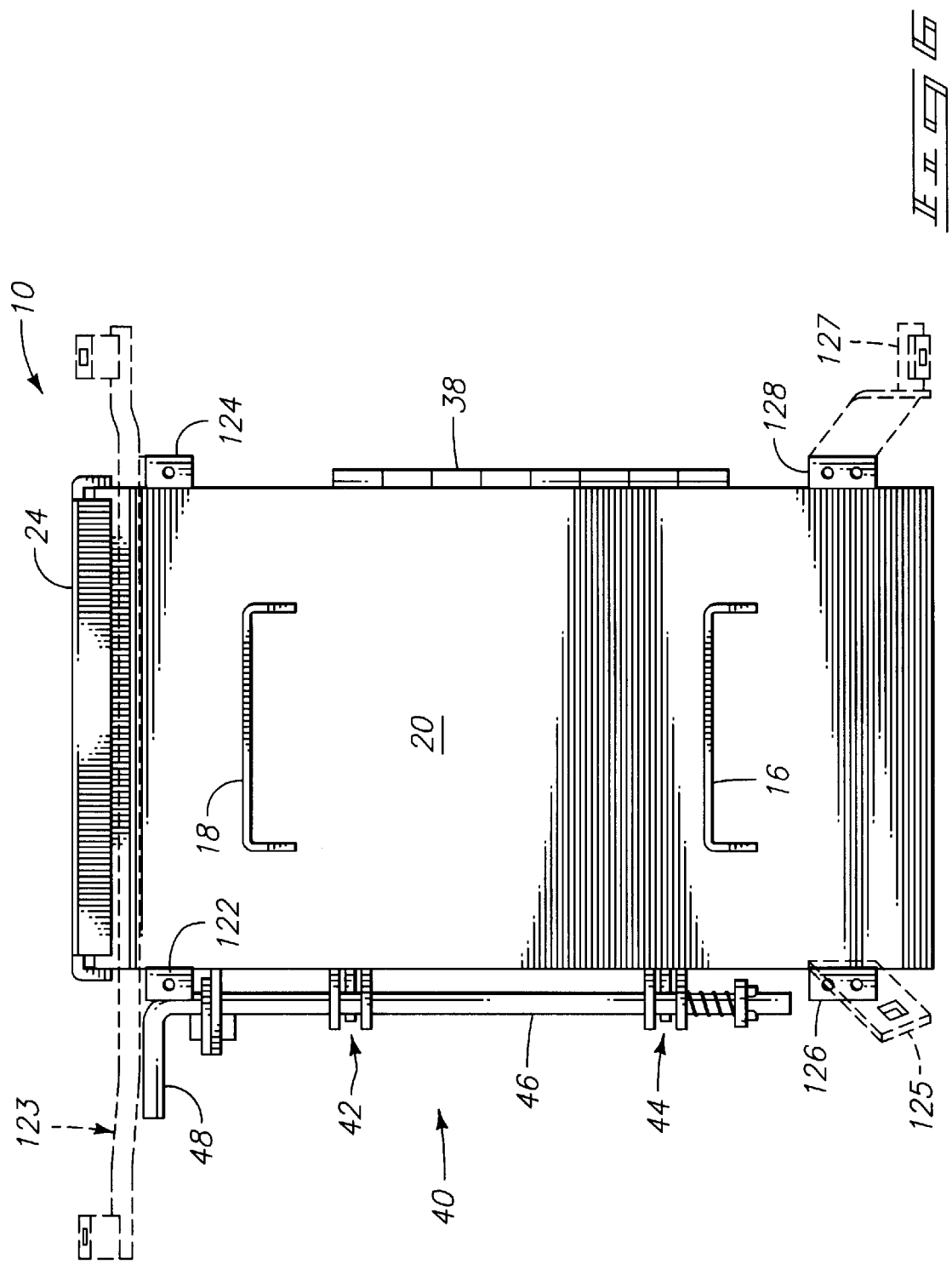

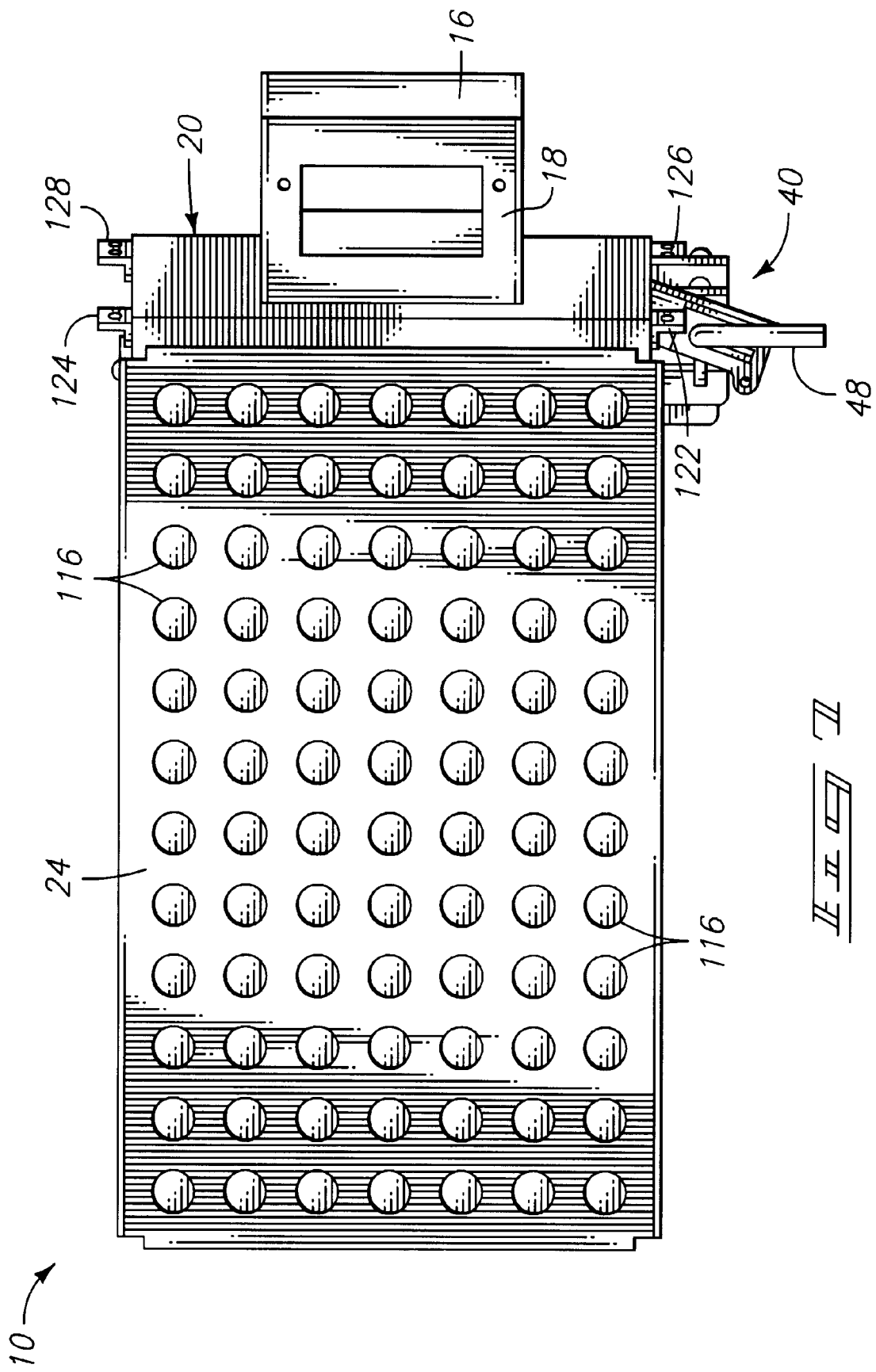

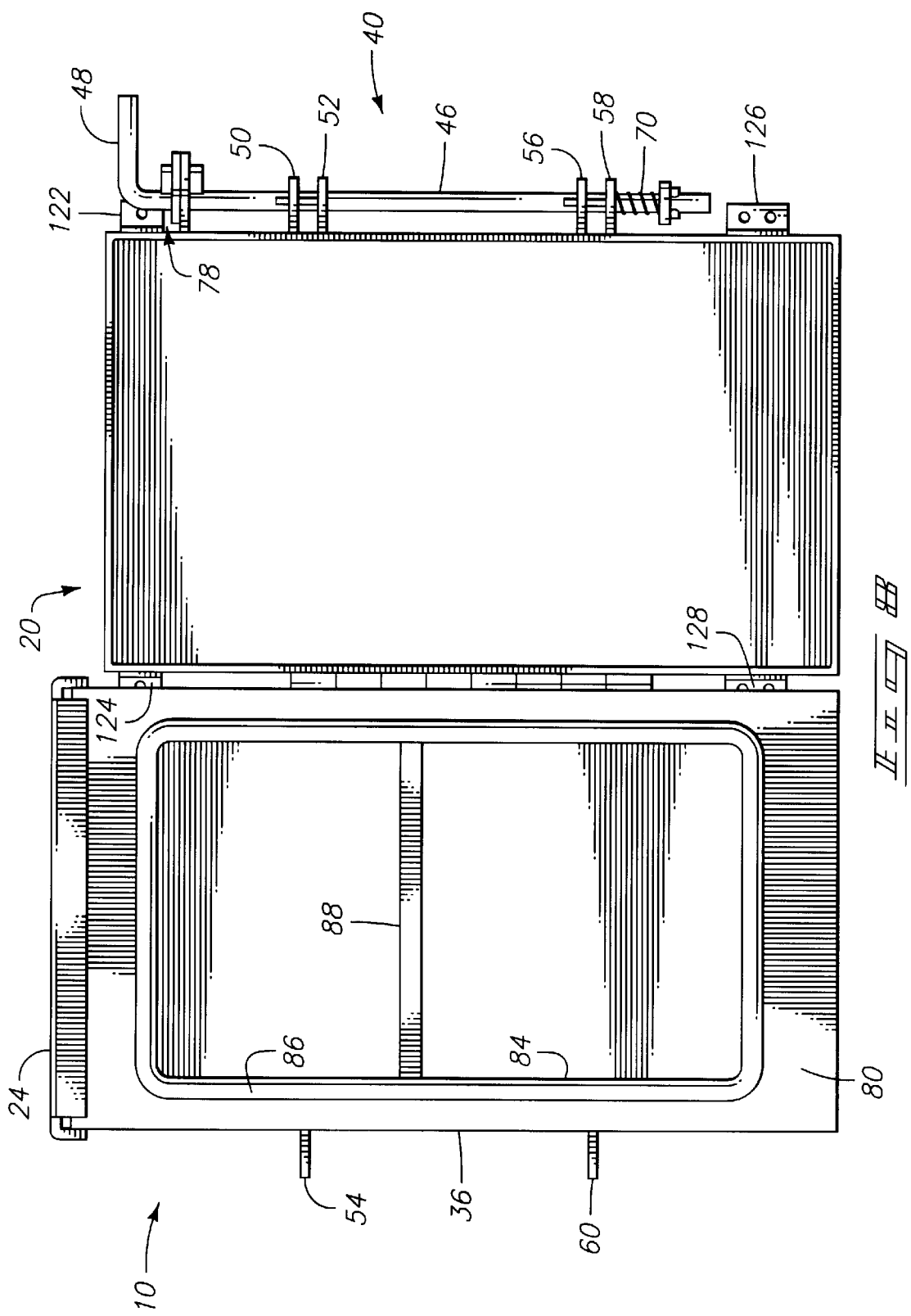

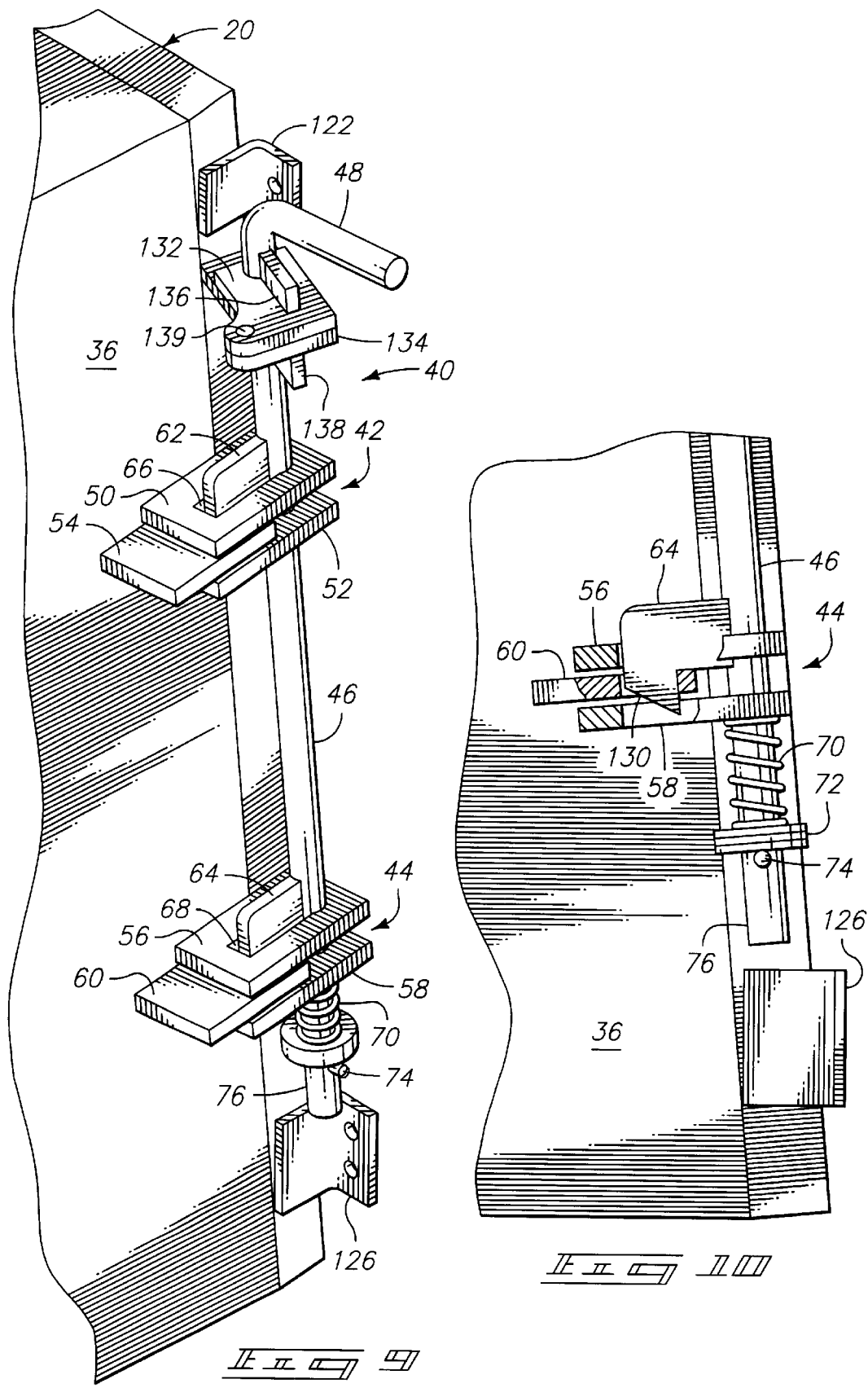

TRUCK STORAGE BOX

CROSS-REFERENCE TO RELATED APPLICATIONS

This application claims priority to U.S. Provisional Patent Application, Serial No. 60/118,950, filed Feb. 5, 1999, which is herein incorporated by reference.

FIELD OF THE INVENTION

This invention pertains to storage boxes, and in particular to a storage box which can be used on a commercial truck.

BACKGROUND

Commercial trucks have a need for storage compartments to store items such as tire chains, tools, tie-downs, and the like. It is not always practical to store these items in the truck cab, and therefore such storage boxes or compartments are typically attached to the outside of the truck. Additionally, such storage boxes can be used to house one or more portions of an operating system or auxiliary system of a commercial truck. For example, automotive batteries make up a portion of the electrical operating system of a commercial truck. Often, the batteries of a commercial truck are housed in a storage box to provide protection and to facilitate access. As a further example, some commercial trucks employ auxiliary power units for operating various components of the truck without running the main vehicle power plant. Such an auxiliary power unit is an example of an auxiliary system of which the whole or portions can be housed in a storage box. Further examples of such operating and auxiliary systems include filters, fuel heaters, on-board engine pre-heaters, hydraulic pumps, and pumps and blowers for handling bulk cargo. For large trucks having significant ground clearance, storage boxes are usually located between the front and rear axles, and are frequently attached to the frame rail, or chassis of the truck.

A recent trend in large trucks has been to design the body of the truck to be aerodynamic to improve fuel economy. One particular area where aerodynamic body panels are now being used is in the area between the front and rear axles, particularly below the cab of the truck. This is the area traditionally occupied by fuel tanks and storage boxes. It is also becoming more prevalent among truck manufacturers to configure such aerodynamic body panels into a full-length side skirt fairing, which runs the entire length of the vehicle between the front and rear axles. Consequently, the fuel tanks and storage boxes on such trucks are oftentimes concealed by one or more aerodynamic body panels which can make up either a partial or a full-length side skirt fairing. Access to the fuel tank filler neck for fueling can be had through a small cutout in the body panel. On vehicles having partial or full-length side skirt fairings, access to the prior art storage boxes has been gained by reaching over the top of a body panel which makes up the fairing. In this arrangement, the access door of some prior art storage boxes has been located on the top of the box.

However, top-mounted doors provide only limited access to the interior contents of the storage box and, in addition, can cause back strain to persons accessing the contents. Alternatively, prior art storage boxes with vertically-hinged side doors can be used. However, the use of prior art storage boxes having vertically-hinged door configurations in conjunction with side skirt fairings sometimes requires the boxes to have a reduced width in order to provide adequate access clearance between the box and the fairing. This results in storage boxes of reduced size which do not utilize all of the available space between the truck frame rail and body panel. Also, access to prior art storage boxes is hindered by the various structural members that are employed to support and brace the body panels which make up the side skirt fairings. additional consequence, trucks requiring large storage boxes for housing certain systems sometimes cannot be configured with full-length skirt fairings due to the aforementioned problems.

It is therefore desirable to find a way to include full-width storage boxes having vertically hinged access doors on large commercial trucks that incorporate aerodynamic body panels as part of partial and full-length side skirt fairings.

SUMMARY OF THE INVENTION

A truck storage box having an access door, wherein the access door comprising an aerodynamic body panel of the kind used on commercial trucks and the like. In one embodiment the access door is hinged along a vertical hinge to open in a traditional door-like manner, as opposed to swinging upward or downward. The storage box can be affixed to the truck chassis between the front and rear axles of the truck. The aerodynamic body panel on the storage box can be overlapped on one end by an adjacent body panel such that an access door of the storage box can still be opened without interference between the two body panels. This allows a continuous aerodynamic surface to be provided for on the truck body, yet still allow for the access door to be opened.

The access door can further include a step or steps which can be used by a driver to ease ingress and egress from the cab of the truck or facilitate climbing to the top of the frame rails behind the cab. The step or steps can be affixed to the door through cutouts in the aerodynamic body panel. The storage box is preferably constructed of a strong material such that it can bear the weight of a person using the step or steps. More preferably, the material of construction is of a lightweight material such as aluminum to reduce weight.

The storage box can further comprise a latch to secure the access door. In one embodiment, the latch is configured such that it can be accessed by reaching behind the body panel at the top of the panel, but such that the latch is not visible to a casual observer. This renders the existence of the storage box invisible to passers-by, which provides security from theft. A mechanism to attach a lock to the latch or door can be further provided to add an additional level of security for the storage box.

The invention further includes a method of retrofitting a commercial truck having aerodynamic body panels with a storage box. In the method, a first body panel is removed from the truck. The first body panel is preferably located between the front and rear axles of the truck below the cab of the truck, and may be mounted to the truck by a mounting bracket or the like. The mounting bracket is removed, providing a space where the storage box can be installed. The storage box is secured to the truck. Preferably, the storage box is secured to the chassis frame rail of the truck by a secure method, such as by using bolts. If the removal of the mounting bracket has made accessible existing mounting holes in the frame rail, these can be advantageously used to assist mounting of the storage box. The first body panel is secured to a front access door of the storage box. The storage box is dimensioned such that when the first body panel is attached to the access door, it is located in the same position as it originally was on the truck prior to being removed. When an adjacent body panel is present, the first body panel is mounted to the access door of the truck such that the door can be opened without interfering with the adjacent body panel. This can be achieved by overlapping the adjacent body panel over the outer surface of the first body panel at the point where the body panels mate on the hinge side of the access door. If an adjacent body panel overlaps on the latch side of the door, the body panel affixed to the access door should overlap the outer surface of the adjacent body panel.

BRIEF DESCRIPTION OF THE DRAWINGS

FIG. 2 is an isometric view of a storage box of the present invention showing the aerodynamic body panel on the access door.

FIG. 3 is an isometric view of the storage box of FIG. 2 with the aerodynamic body panel removed.

FIG. 4 is an isometric view of the storage box of FIG. 3 from the side opposite that shown in FIG. 3.

FIG. 5 is a left side elevation view of the storage box of FIG. 3.

FIG. 6 is a front elevation view of the storage box of FIG. 3.

FIG. 7 is a top view of the storage box of FIG. 3 showing grating which can be added to the top of the box.

FIG. 8 is a front elevation view of the storage box of FIG. 3 showing the access door in an open position.

FIG. 9 is an isometric view of a latch that can be used to secure the access door of the storage box.

FIG. 10 is a side elevation detail of the latch of FIG. 9.

DESCRIPTION OF PREFERRED EMBODIMENTS OF THE INVENTION

Figure 1:
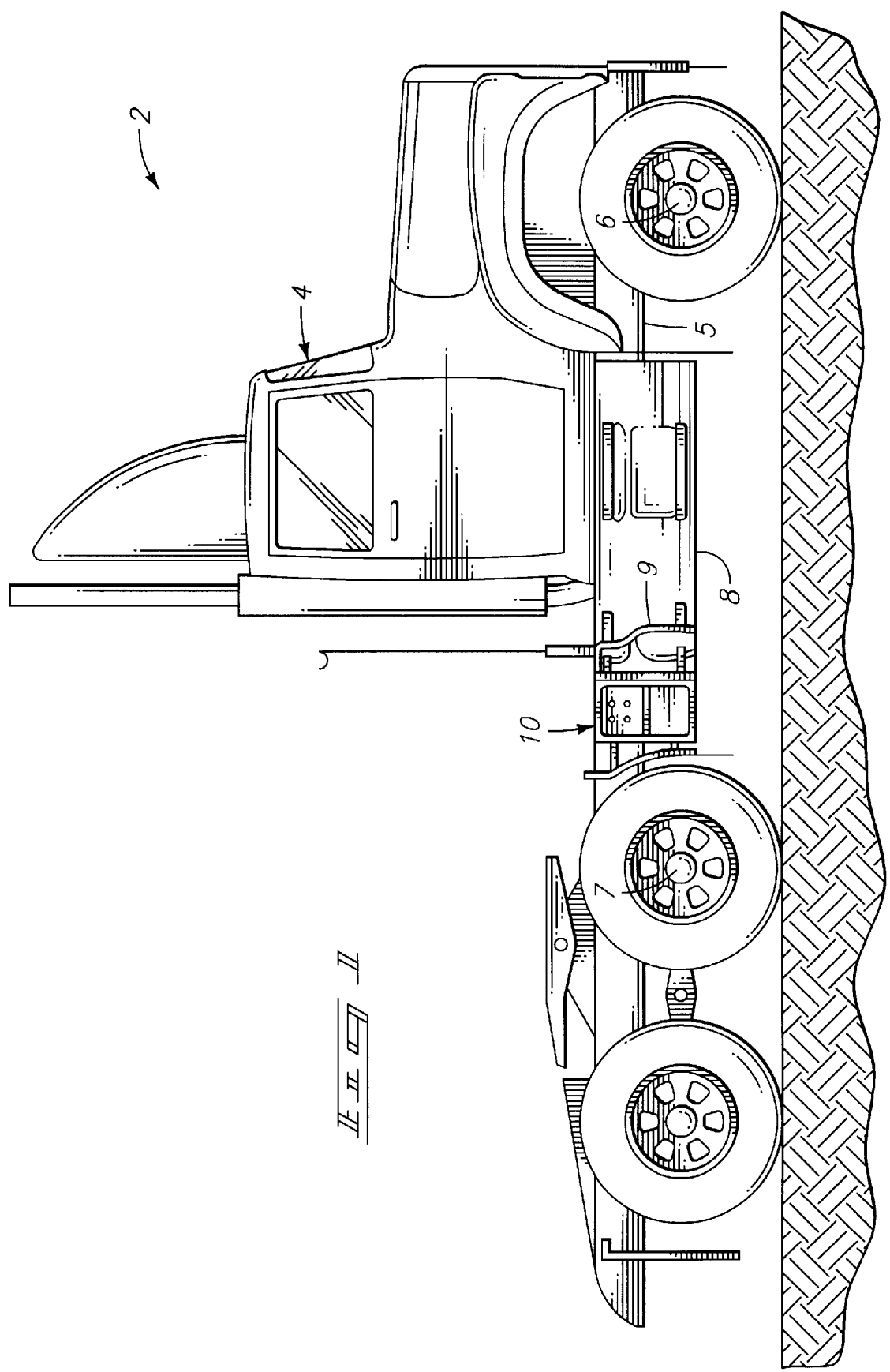
FIG. 1 is a side elevation view of the tractor of a commercial truck incorporating a storage box of the present invention.

With reference to FIG. 1, the tractor 2 of a commercial truck is shown. The tractor comprises a cab section 4 which is mounted to a chassis or frame rail 5. Between the front axle 6. and the rear axle 7, and below the cab section 4, are located aerodynamic body panels 8 and 9. Body panel 8 typically covers the fuel cell. Body panel 9 typically covers a void section aft of the fuel cell and in front of the first rear axle 7. This void section offers a convenient location for storage box 10, which can be mounted to the frame rail 5. Body panel 9 can be affixed to the access door of the storage box 10. In FIG. 1, the access door of the storage box is shown in an open position so that the body panel 9 is viewed from the end, rather than frontally as is body panel 8 in the figure. It is understood that body panel 9 can be an existing body panel produced by the manufacturer of the truck, and is attached to the truck by brackets or the like in the absence of the storage box 10.

The Apparatus

Turning to FIG. 2, an isometric diagram of the storage box 10 is shown. The aerodynamic body panel 9 is shown attached to the front of the box 10. Turning briefly to FIG. 3, it is seen that body panel 9 is affixed to and covers access door 20. Since the body panel 9 typically comprises an OEM (original equipment manufacturer) body panel provided with the truck, while the storage box 10 can be provided as an after-market accessory, the body panel will likely be provided with mounting clips and attachment points, allowing it to be secured to the truck in the absence of the storage box. Such mounting clips and attachment points can be reused, with or without modifications as required, to attach the body panel 9 to the access door 20 of the storage box, as shown in FIG. 3. The body panel is typically fabricated from fiberglass composite or aluminum. Other known methods of securing body panels of this type can be employed to secure the body panel 9 to the access door 20.

Referring to FIGS. 3 and 6, one embodiment of the apparatus for attaching the body panel to the door 20 is shown. Tabs 122, 124, 126 and 128 are attached to and extend laterally from the edges of the door 20. Body panel braces 123, 125, and 127 are, in turn, fastened to the tabs 122, 124, 126, 128 to support a panel from a Kenworth T2000 truck, as described more fully in the example below. The body panel braces 123, 125, 127 are typically OEM body panel braces which were originally installed on the truck and which have body panel attachment points to which the body panels are fastened. The panel braces 123, 125, 127 are located in relation to the access door 20 such that the body panel attachment points are in their original locations relative to the truck.

The geometry of the storage box 10 is configured such that when the body panel 9 is attached to the access door 20, and the storage box is mounted to the truck, the body panel 9 lies in alignment with other adjacent body panels. Further, the storage box is preferably configured to maximize storage capacity in the available space. For these reasons, the storage box shown in the Figures has the sloped front. Other applications to particular vehicles can result in different geometries than that shown in the accompanying figures. The particular example shown fits on a Kenworth T2000 truck tractor, and fits aft of the right side fuel cell, and in front of the rear axles, as shown in FIG. 1. For fitting on the left side of the Kenworth T2000 truck tractor, the hinge 38 is oriented on the left side of the storage box 10 (as viewed from the front), rather than on the right side as shown is shown in FIG. 6.

When body panels 8 and 9 overlap at adjacent edges, it is preferable that body panel 9 be located under the overlapping portion of body panel 8. This allows the access door 20 to be opened in the manner shown in FIG. 1 such that there is no binding between the adjacent body panels. Body panel 9 can be provided with a recessed lip 22 as shown in FIG. 2 to facilitate such advantageous overlap of the body panels. A rubber gasket (not shown) can be attached to one of the body panels along the overlapping edge to reduce vibration between body panels.

Figure 11:
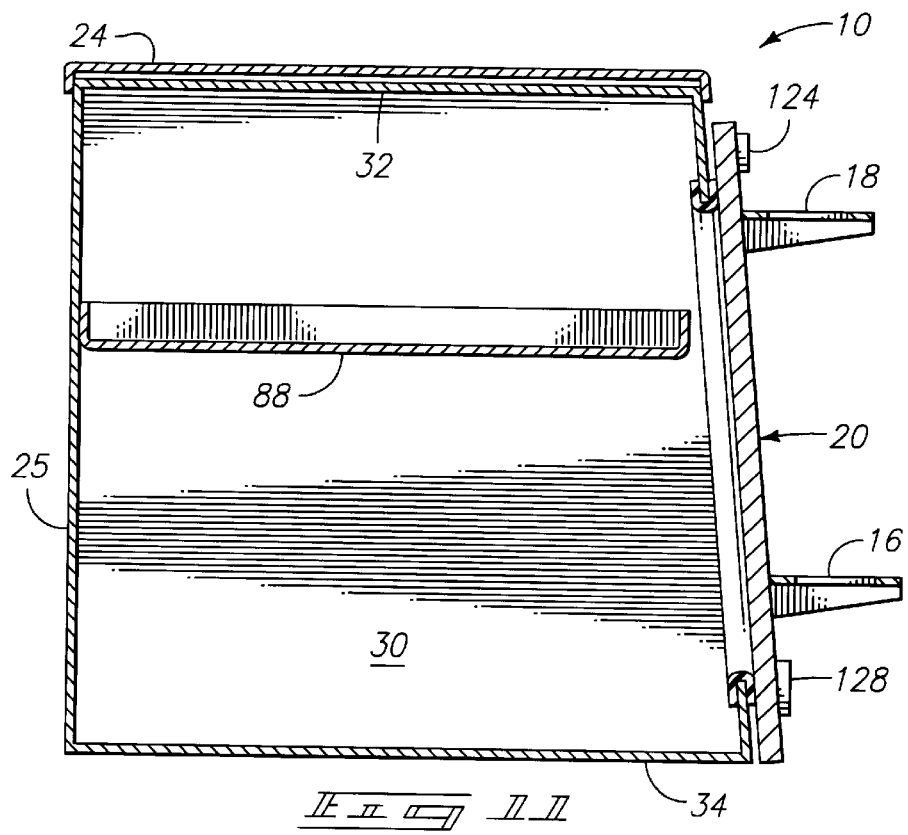
FIG. 11 is a side elevation view of the storage box of FIG. 5 showing a storage shelf inside the box.

As shown in FIGS. 2, 3, and 7, the top of the storage box 10 can be provided with a grating 24 to provide a surface upon which a person can stand. The grating shown is provided with holes 116, and is mounted slightly above the top panel 32, as shown in FIG. 11. This facilitates runoff of water from the grating, providing a safer surface upon which a driver can stand. Additionally, the grating 24 can be provided with a textured surface to reduce slippage of a shoe or boot on the grating.

The storage box 10 can be further provided with steps 12 and 14 which protrude through respective cutouts 13 and 15 in the body panel 9. The steps 12 and 14 can be secured to respective brackets 16 and 18 of FIG. 3, which are in turn secured to the access door 20 by a method such as welding or bolting. The steps 12 and 14, as well as the grating 24, can be used for example to facilitate ingress and egress of a driver from the cab 4 of the truck, or to allow a driver to climb on top of the truck box or truck frame in order to connect cables and the like to a trailer.

Inasmuch as the storage box is ideally designed to support the weight of a driver, the storage box 10 is preferably fabricated from a strong material, and is secured to the truck in a manner to avoid becoming detached due to bearing the weight of a driver or from repeated stress cycles due to vibration. In one example, the storage box 10 is secured to the frame rails of the truck in conjunction with two external support brackets 28 which are bolted to the right side 30, left side 36, and bottom 34 of the storage box 10 as shown in FIGS. 2 through 5 (bolts not shown). As best seen in FIG. 4, each bracket 28 has two mounting holes 26, each of which are substantially aligned with complimentary mounting holes (not shown) in the back 25 of the storage box 10. The storage box 10 and brackets 28 are secured to the frame rails of the truck using four ⅝inch steel mounting bolts (not shown), each bolt having a 1 inch diameter washer on the inside of the storage box to prevent tear-out of the bolt from the storage box. Referring to FIG. 4, the mounting bolts pass through the mounting holes 26 in the brackets 28 and through the complimentary mounting holes (not shown) in the back 25 of the storage box 10, as well as through holes in the frame rail, securing the storage box 10 to the frame rail of the truck, as shown in FIG. 1. In this example, the sides and back of the storage box are fabricated from a single piece of ⅛inch thick aluminum with a radiused bend at the corners. The top and bottom of the storage box are also fabricated from ⅛inch thick aluminum and are welded to the sides and back of the storage box.

FIG. 8 shows a front elevation view of the storage box 10 with the door 20 in an open position. In the example shown, the door 20 is fabricated from a single piece of sheet steel. Turning to FIG. 3, the hinge 38 is shown as connecting the access door 20 to the right side 30 of the storage box 10. The design of the hinge 38, and its manner of connection to the door 20 and the right side 30, are not constrained to any particular configuration. In the example shown, the hinge is welded to the side 30 and door 20 of the storage box 10. While a single hinge is shown in the example, a plurality of hinges can be employed as well. When it is anticipated that the door will need to support loads in excess of the door weight itself, such as when the door incorporates steps 12 and 14 as shown in FIG. 2, the hinge should be designed to withstand the anticipated stresses.

Turning now to FIG. 4, a door latch 40 is shown. The door latch 40 secures the door 20 to the left side 36 of the storage box 10. While any known latching mechanism can be employed, the latch shown is particularly beneficial for the intended use. The latch 40 is shown in side view in FIG. 5, and in front view in FIG. 6 with the door 20 in a closed position. FIG. 8 shows the front view of FIG. 6, but with the door 20 in an open position. (It should be noted that the door is normally configured to open 90 degrees, rather that 180 degrees, as shown. The reason for limiting the swing of the door is to prevent interference between the body panel attached to the door and the other body panels on the truck. This aids in preventing damage to the body panels which can result if the body panels are allowed to contact one another as the door is opened.) As seen in FIG. 6, the latch 40 comprises upper catch 42 and lower catch 44. The latch further comprises latch rod 46 which operates the catches, and which terminates on an upper end in handle 48.

Turning now to FIG. 9, a detail of the latch 40 of FIG. 4 is shown in an isometric view. Upper catch 42 comprises upper and lower catch plates 50 and 52, respectively, as well as central catch plate 54. In like manner, lower catch 44 comprises upper and lower catch plates 56 and 58, respectively, as well as central catch plate 60. As is seen in FIG. 8, the upper catch plates 50 and 56, as well as the lower catch plates 52 and 58, are secured to the door 20, while the central catch plates 54 and 60 are secured to the left side 36 of the storage box 10. Latch rod 46 is configured to slide freely within openings in catch plates 50, 52, 56 and 58.

Referring again to FIG. 9, the upper catch plates 50, 56, central catch plates 54, 60, and lower catch plates 52, 58, of each catch 42 and 44 are all provided with a slot or opening 66 and 68, respectively, which aligns in all three plates of each catch when the door 20 is in a closed position. The latch rod 46 is provided with upper clasp plate 62 and lower clasp plate 64. Referring to FIG. 10, a sectional view of the lower catch 44 is shown. Clasp plate 64 is provided with a tooth 130 which is configured to fit within the openings 68 (see FIG. 9) in the catch plates 56 and 60. The tooth 130 is advantageously beveled in the direction shown such that when the door 20 is closed, the tooth 130 strikes the forward outside edge of the central catch plate 60, forcing the clasp plate 64, and hence the latch rod 46, in an upward direction. Once the tooth 130 has cleared the opening 68 in the central catch plate 60, spring 70 (discussed more fully below) forces the tooth 130 of the clasp plate 64 into the opening 68 in central catch plate 60, thusly securing the catch 44. Upper catch 42 is configured similarly to lower catch 44, in that it is provided with a clasp plate 62 having a tooth (not visible in the figures). Upper catch 42 operates in a similar manner as lower catch 44, as described above.

The latch is further provided with spring 70. Turning to FIG. 10, a left side view of lower catch 44 is shown. Spring 70 is a coil spring disposed about the lower end of latch rod 46. The spring is constrained in a partially compressed state between lower catch plate 58 and retaining discs 72. Lower catch plate 58 is affixed to the edge of door 20, while retaining discs 72 are secured to the lower portion of latch rod 46 by cotter pin 74. Spring 70 thereby biases latch rod 46, and thus clasp plates 62 and 64, in a position such that the clasp plates are disposed within openings 66 and 68, respectively, when the clasp plates are aligned with the openings, to thereby secure the latch 40. When the latch rod 46 is pulled in an upward direction by handle 48 of FIG. 9, clasp plates 62 and 64 move out of the openings 66 and 68, allowing the door to be freely opened. Pulling the latch rod 46 upward from its normally biased position compresses spring 70 further, such that when the handle is released spring 70 returns the latch rod and clasp plates to their normally closed position. The tension on spring 70 can be adjusted by increasing or decreasing the number of retaining discs 72. Retaining discs 72 can comprise simple metal washers configured to fit over latch rod 46.

As can be seen in FIG. 2, when the body panel 9 is in place on the storage box 10, the latch handle 46 is essentially invisible to the casual passer-by, providing a level of security for contents within the box. For additional security, the door 20 can be secured in a closed position by a locking apparatus. Turning to FIG. 9, one embodiment of such a locking apparatus is shown. Latch rod 46 is provided with an upper lock plate 132 which is rigidly attached thereto by a method such as welding. A complimentary lower lock plate 134 is rigidly attached to the edge of door 20 by a similar method. The lower lock plate 134 is provided with an opening (not shown) through which the latch rod 46 is movably disposed.

The upper lock plate 132 is provided with a slot 136 in which an alignment tab 138 is positioned. The alignment tab 138 is rigidly attached to both the latch rod 46 and the upper lock plate 132 by a method such as welding. The lower lock plate 134 is also provided with a slot (not shown) into which the alignment tab 138 freely fits. When the latch rod 46 is in the latched position, the alignment tab 136 is in alignment with the slot in the lower lock plate 134, allowing the alignment tab to freely enter the lower slot. The upper lock plate 132 can be further provided with lock hole 139 as shown in FIG. 9. The lower lock plate 134 is also provided with a complimentary lock hole (not shown) which substantially aligns with the hole 139 when the latch rod 46 is in the latched position. A lock, such as a padlock, can be placed such that the bolt of the padlock is disposed through both the hole 139 in the upper lock plate 132 and through the hole in the lower lock plate 134, restricting relative vertical movement bet the upper lock plate 132 (and similarly the alignment tab 136) and the lower lock plate 134, thereby securing the alignment tab in the lower lock plate slot and effectively secure the latch 40 in a latched position.

Reference is now made to FIG. 8, which shows a front elevation view of the storage box 10 with the door 20 in an open position. The front of the storage box 10 shown here includes a front panel 80, having an opening 84 allowing access to the interior of the storage box 10. The example shown includes a shelf, 88. Preferably, a gasket or seal 86 is disposed about the periphery of the opening 84. The gasket preferably comprises a flexible, compressible material, such as rubber. The gasket should be of a resilient material, and resistant to aging under various weather conditions. Further, the gasket should be attached to the periphery of the opening in a manner such that it can be removed relatively easily for replacement. One manner of removably attaching the gasket is to use a gasket having a channel formed therein to accommodate the edge of the periphery of the opening 84, much in the manner of an automotive windshield seal. The gasket serves to provide a water-tight seal about the opening 84. The gasket further provides a beneficial functional aspect of biasing the door in a slightly open position. In this manner, in order to secure the door using the latch 40, the gasket must be slightly compressed. As the door in the closed position will be slightly biased towards an open position, the latch components which are movable with respect to one another will tend to be held in relatively fixed position, reducing vibration and rattling of the latch components.

Figure 12:
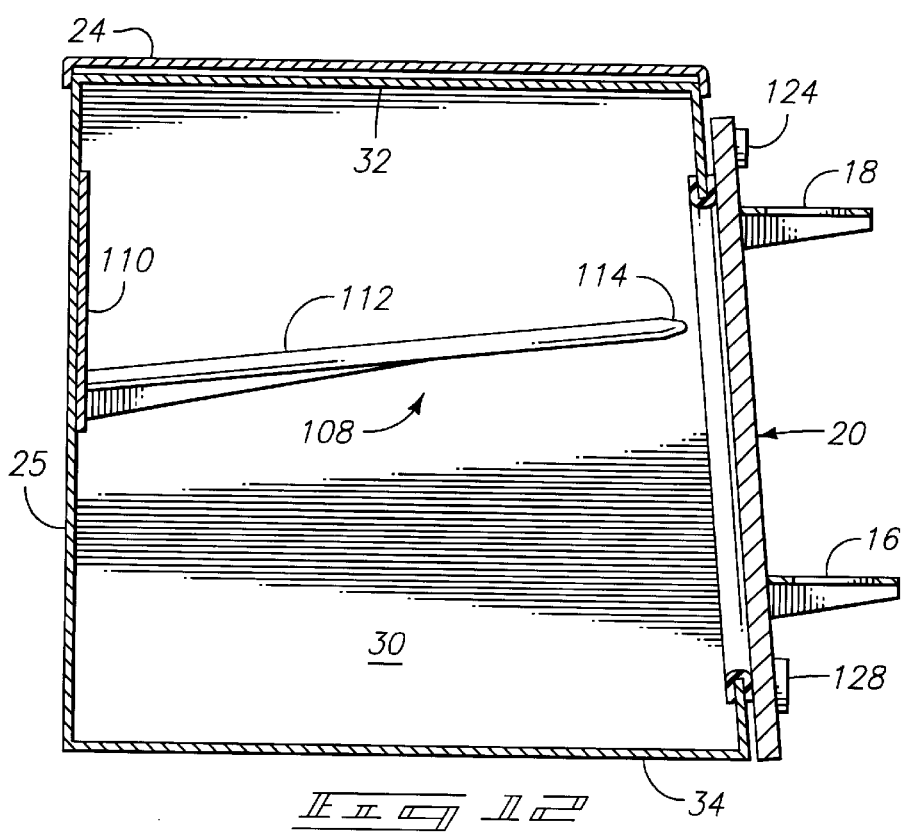
FIG. 12 is a side elevation view of the storage box of FIG. 5 showing a tire chain storage rack inside the box.

FIGS. 11 and 12 show left side elevation sectional views of the storage box 10. FIG. 11 shows the storage box 10 provided with an intermediate shelf 88. Shelf 88 is secured to the interior of the storage box 10 utilizing bolts (not shown) which pass through the shelf 88, and through the right side 30, left side 36, and back 25, as well as the support brackets 28 FIG. 12 shows the storage box 10 provided with an optional tire chain holder 108 instead of shelf 88. Tire chain holder 108 comprises one or more chain supports 112 over which tire chains can be draped. In one example, two chain supports are used, oriented side-by side. Only one chain support 112 is shown in FIG. 12. Preferably, the chain supports 112 are oriented at a slight upward angle from the back 25 of the storage box to the door 20 to reduce the tendency of chains to slide towards the access door or off of the chain supports 112. Further, the length of the chain supports 112 are selected such that the tip 114 of the chain support is very near the inside surface of the door 20 when the door is in a closed position. In this manner chains will not be able to slide off of the chain supports. The chain holder 108 can be secured to the storage box 10 by mounting plate 110, which can be provided with mounting holes which match the mounting holes 26 in the back 25 of the storage box, as shown in FIG. 4. Chain supports 112 are rigidly attached to mounting plate 110.

The Method

In the method, an existing truck tractor is retrofitted with a storage box in an otherwise unused area behind a body panel. More particularly, the area is located behind an aerodynamic body panel between the front and rear axles of the truck. Prior to the use of aerodynamic body panels, such areas were widely used for storage boxes. The introduction of aerodynamic body panels has made access to such areas impractical or impossible. The present invention discloses a method of locating a storage box into these otherwise unusable areas, but still allowing the aerodynamic body panel to be used.

In the method, a body panel on the truck is first identified under which a storage box can be located. The body panel is removed to expose the area in which the storage box will be located. A storage box configured to fit within the area exposed by the removed body panel is provided. Any brackets or components remaining on the truck following removal of the body panel, and which would interfere with the installation of the storage box in the identified area, are removed or relocated. A common practice among truck manufacturers is to utilize lightweight, elongated, tubular braces adjacent to the inside surface of the body panels to provide mounting points thereto. Often, these braces can be re-used by attaching them to the storage box access door, thereby providing mounting points for the body panels when they are attached to the access door. In some instances, slight modifications to the braces may be necessary prior to attachment to the access door.

After removal of the body panels and related support structure, the storage box is secured to the truck. One method of securing the storage box to the truck is by attaching the back of the storage box to the frame rail of the truck such that an access door on the storage box is outward facing. When possible, existing brackets and mounting points on the frame of the truck can be used to mount the storage box to minimize modifications to the truck and reduce installation time.

Following securing the storage box to the truck, the removed body panel and body panel support braces are attached to the access door of the storage box. It is not necessary that this step be performed in this order: in some instances, the body panel can be attached to the storage box prior to mounting the storage box to the truck. Preferably the geometry of the storage box, and the position in which the storage box is mounted to the truck, are selected such that the body panel which is attached to the access door of the storage box is oriented in the same or nearly the same position as it was prior to having been removed from the truck.

Where the storage box body panel overlaps an adjacent body panel, the panels are preferably oriented to prevent binding and interference of the panels when the access door of the storage box is opened and closed. For body panels which are adjacent at the hinge side of the access door, this will typically result in the adjacent body panel overlapping the storage box body panel on the outside of the storage box body panel. For body panels which are adjacent at the non-hinge side of the access door, this will typically result in the storage box body panel overlapping the adjacent body panel on the outside of the adjacent body panel.

The storage box can be provided with a latch to secure the access door of the storage box in a closed position. The storage box can be further provided with steps to allow a driver to more easily access the cab of the truck or the top of the frame rails behind the cab. The steps can either be added as an additional feature to the storage box, or they can be existing steps from the truck which were removed when components were removed to allow installation of the storage box on the truck. In the latter instance, the existing steps are preferably re-used. The steps are secured to the storage box, as for example by securing them to the access door of the storage box through cut-outs in the body panel.

The storage box can be further provided with internal components to facilitate use of the storage volume. For example, a shelf can be provided, or a tire chain hanger. The tire chain hanger is preferably oriented to urge chains hung thereon towards the back of the storage box. Additionally, the distance between the end of the tire chain hangers and the access door, when in a closed position, is reduced or minimized to reduce the likelihood of chains slipping off of the tire chain hangers when the truck is in motion.

EXAMPLE

In one example, a storage box is fit to a Kenworth T2000 truck tractor. The Kenworth T2000 is fitted with aerodynamic body panels beneath the passenger compartment, between the front and rear axles. A first such body panel covers the fuel cell. Aft of the fuel cell, and in front of the rear axle, a second body panel covers an area which is essentially a void area. Steps are mounted to the frame rail of the truck in the void area by at least one step support bracket. The steps facilitate access to the top of the frame rails behind the truck cab. Cutouts in the second body panel allow the steps to be mounted to the step support brackets near the outer surface of the second body panel. The first and second body panels are mounted to at least one common brace which runs forward from a mud flap in front of the forward rear axle towards the front of the truck. The first body panel overlaps the second body panel such that the overlapped edge of the second body panel is beneath the edge of the first body panel.

To prepare the void area aft of the fuel cell for the storage box, the first and second body panels are removed from the truck. The portion of the bracket which was used to support the second body panel is removed to allow the storage box to be installed. The steps, and accompanying step support brackets, are also removed from the void area.

A storage box, generally designed and constructed in accordance with the description provided herein, is provided. The storage box generally resembles that of FIGS. 3 and 4. The forward slope of the front of the storage box is provided to assist the second body panel in being correctly aligned with the first body panel following installation of the storage box and body panels. The storage box is provided with four mounting holes 26 in the back 25 of the storage box, as indicated in FIG. 4. These holes mate with existing holes in the frame rail of the truck which are made available by removal of the existing step support bracket. Two additional mounting holes are formed in the frame rail of the truck to accommodate the reinstallation of one of the OEM step brackets in a more forward location to support the aft end of the first body panel. Bolts, nuts and washers are used to secure the storage box to the truck frame rail in a removable manner.

When the storage box is mounted on the right side of the truck, as shown in FIG. 1, the hinge of the access door is located on the right side of the access door (viewing the storage box from the front), as shown in FIG. 8. When the storage box is mounted on the left side of the truck, the hinge of the access door is located on the left side of the access door (viewing the storage box from the front). Thus, in either event the hinge will be located towards the front of the truck. This is useful in assuring that the access door of the storage box can be opened without interference of the first and second body panels, and also resists air current forces from tending to open the door of the storage box when the truck is in motion.

The second body panel is secured to the access door of the storage box by way of tabs 122, 124, 126, 128 which protrude from the edges of the access door, and the OEM braces 123, 125, 127 which have been slightly modified by cutting and which have been fastened to the tabs 122, 124, 126, 128 as shown in FIG. 3. The storage box is provided with new step support brackets 16 and 18 of FIG. 3. These protrude through the existing step support cutouts in the second body panel. Stair treads 12 and 14 of FIG. 2 are secured to the new step support brackets 16 and 18 of FIG. 3. A top grating 24 is attached to the top of the storage box.

One of the OEM step brackets is reinstalled in a more forward location to support the aft end of the first body panel. The first body panel is reattached to the truck, using the reinstalled OEM step support bracket as well as existing brackets and attachment points. Following installation of the storage box and the body panels, the forward edge of the second body panel, mounted to the storage box, lies beneath the rearward edge of the first body panel. Thus, when the access door of the storage box is opened, as shown in FIG. 1, that portion of the second body panel which is overlapped by the first body panel rotates inwardly towards the frame rail, avoiding contact with the overlapping edge of the first body panel.

The storage box can be provided with further details, such as the latch, shelf, and chain holders generally described further herein above.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A truck storage box affixed to a truck chassis between the front and rear axles of the truck, wherein the storage box comprises an access door, the access door comprising a first aerodynamic body panel, and wherein the first aerodynamic body panel is overlapped on one end by a second adjacent body panel such that the access door of the storage box can be opened without substantial interference between the first and second body panels, and further wherein the access door further comprises at least one step affixed to the door through a cutout in the aerodynamic body panel.

2. The truck storage box of claim 1, and further comprising a latch to secure the access door in a closed position, said latch being configured such that the latch is accessed by reaching behind the aerodynamic body panel at the top of the panel when the storage box is mounted on a truck, and such that the latch is hidden from view from passers-by.

3. The truck storage box of claim 2, and further comprising a lock attachment plate to allow the latch to be locked into a secured position.

* * * * *